(12) United States Patent
Qu et al.

(10) Patent No.: US 12,360,998 B2
(45) Date of Patent: Jul. 15, 2025

(54) DISTRIBUTED QUERY PLAN GENERATION

(71) Applicant: SAP SE, Walldorf (DE)

(72) Inventors: Faming Qu, Xi'an (CN); Paul Willems, Heidelberg (DE); Yuncong Qiao, Xi'an (CN); Zhen Tian, Xian (CN)

(73) Assignee: SAP SE, Walldorf (DE)

( * ) Notice: Subject to any disclaimer, the term of this patent is extended or adjusted under 35 U.S.C. 154(b) by 20 days.

(21) Appl. No.: 17/746,601

(22) Filed: May 17, 2022

(65) Prior Publication Data
US 2023/0376485 A1 Nov. 23, 2023

(51) Int. Cl.
*G06F 16/2453* (2019.01)
(52) U.S. Cl.
CPC .. *G06F 16/24542* (2019.01); *G06F 16/24535* (2019.01)
(58) Field of Classification Search
CPC ......... G06F 16/24544; G06F 16/24535; G06F 16/245
See application file for complete search history.

(56) References Cited

U.S. PATENT DOCUMENTS

| | | | |
|---|---|---|---|
| 2014/0195558 A1* | 7/2014 | Murthy | G06F 16/2358 707/770 |
| 2015/0220571 A1* | 8/2015 | Ku | G06F 16/284 707/752 |
| 2018/0089270 A1* | 3/2018 | Qiu | G06F 16/24542 |
| 2018/0150513 A1* | 5/2018 | Willems | G06F 16/2455 |

OTHER PUBLICATIONS

Wu CSE344; "From Logical Plans to Physical Plans"; Computer Science Course 334 at Washington University; Winter 2015; https://courses.cs.washington.edu/courses/cse344/15wi/sections/sec4-physical-plans.pdf (Year: 2015).*

* cited by examiner

*Primary Examiner* — Amanda L Willis
(74) *Attorney, Agent, or Firm* — Mintz Levin Cohn Ferris Glovsky and Popeo, P.C.

(57) ABSTRACT

A method, a system, and a computer program product for generating an executable query plan. A query requiring access to data stored in a database system is received. Based on the received query, a query execution plan having a plurality of query execution pipelines is generated. Each query execution pipeline in the plurality of query execution pipelines is configured to execute a plurality of operations in a predetermined order associated with each query execution pipeline. The generated query execution plan is fragmented into a plurality of fragments. Each fragment has one or more query execution pipelines in the plurality of query execution pipelines. Each fragment of the generated query execution plan is transmitted to one or more execution locations in a plurality of execution locations for execution. Each fragment of the generated query execution plan is executed at one or more execution locations. One or more results of executions are combined to generate a response to the received query.

20 Claims, 14 Drawing Sheets

DISTRIBUTED QUERY PLAN GENERATION

TECHNICAL FIELD

This disclosure relates generally to data processing and, in particular, to generating and executing distributed query plans.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In some implementations, the current subject matter relates to a computer implemented method for generating an executable query plan. The method may include receiving a query requiring access to data stored in a database system, and generating, based on the received query, a query execution plan having a plurality of query execution pipelines. Each query execution pipeline in the plurality of query execution pipelines may be configured to execute a plurality of operations in a predetermined order associated with each query execution pipeline. The method may further include fragmenting the generated query execution plan into a plurality of fragments, each fragment having one or more query execution pipelines in the plurality of query execution pipelines, transmitting each fragment of the generated query execution plan to one or more execution locations in a plurality of execution locations for execution, executing each fragment of the generated query execution plan at one or more execution locations, and combining one or more results of executions to generate a response to the received query.

In some implementations, the current subject matter may include one or more of the following optional features. One or more locations may include a data consumption location and a data production location.

In some implementations, the method may include determining an order of the executing of the plurality of fragments. The method may also include generating a mapping of each transmitted fragment. The method may also determine that there is a break in one or more query execution pipelines in the plurality of query execution pipelines, and update the generated mapping for each transmitted fragment associated with the determined break in one or more query execution pipelines.

In some implementations, the plurality of fragments may include a root fragment and one or more non-root fragments, where execution of the root fragment may be configured to trigger execution of one or more non-root fragments. Execution of a query execution pipeline of the root fragment may include executing a receiving operator to receive data queried by the received query from one or more non-root fragments. Execution of a query execution pipeline of the non-root fragment may include executing a transmitting operator to transmit data queried by the received query to the root fragment.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
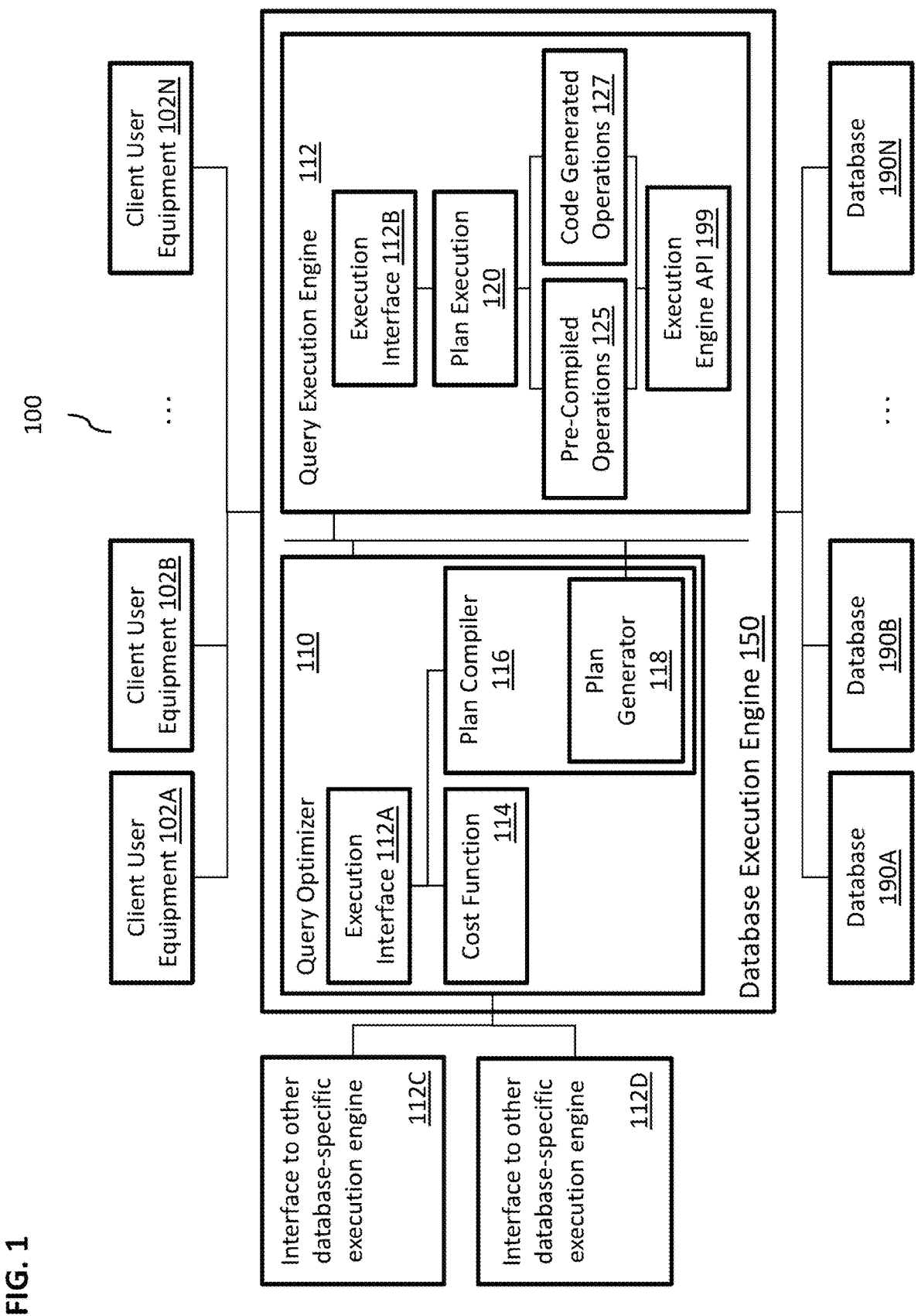
FIG. 1 illustrates an exemplary system, according to some implementations of the current subject matter.

To address these and potentially other deficiencies of currently available solutions, one or more implementations of the current subject matter relate to methods, systems, articles of manufacture, and the like that can, among other possible advantages, provide generation and execution of distributed query plans.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Further, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

FIG. 1 illustrates an exemplary system 100, according to some implementations of the current subject matter. The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query.

To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example implementations, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution.

In some implementations, the query execution engine may be configured to generate a no-cutting distributed query execution and then trigger execution of pipeline to obtain a result of the query. The current subject matter's query execution engine may be configured to generate result rows as soon as the data is obtained from a database and/or any other data location. To support query execution involving more than one data location for the execution engine in a scaled-out computing system (e.g., such as HANA computing system, as described below and available from SAP SE, Walldorf, Germany), the current subject matter may be configured to execute a distributed query processing generating a pipeline-based distributed query executable plan and then triggering and controlling execution of the generated distributed query executable plan.

As part of the distributed query execution, a relation may be configured to be included during generation of a physical algebra plan for the query execution engine 110. The relation may be used for generation of the distributed query executable plan. For example, the relation may be inserted between parent and child data nodes that may be located in different locations. This means that any data exchange between the parent and child nodes using a network (connecting their locations) may occur during a later execution time. The relation may be configured to store information for all locations that generate data from relation's child node, and all locations that consume data for relation's parent node. The relation may also serve as a map between the data producer location and data consumption location.

Figure 2:
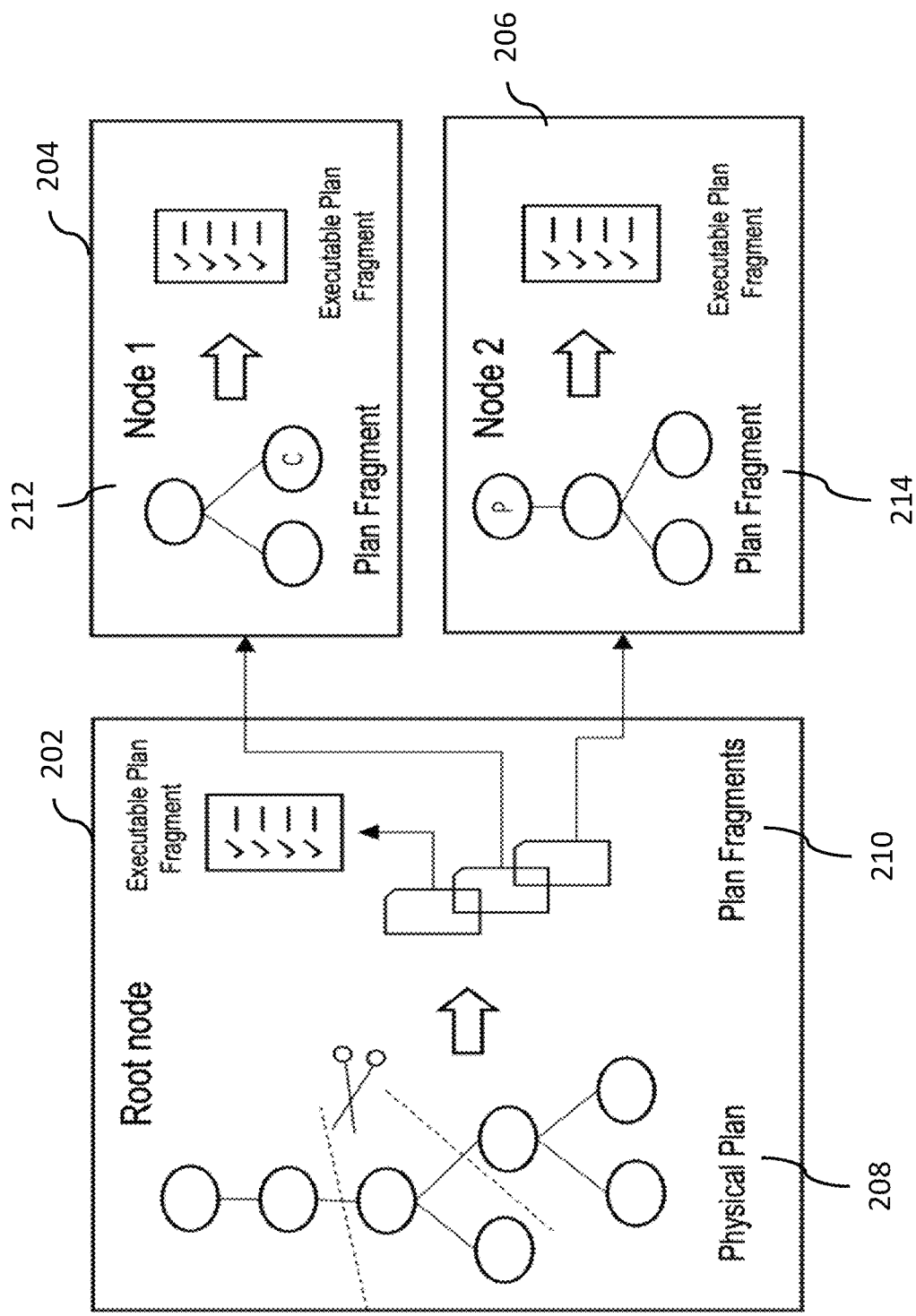
FIG. 2 illustrates an exemplary root node that may include a physical query execution plan that may be split into one or more fragments.

The generated physical algebra plan may be split into one or more plan fragments. In some implementations, the plan may be split based on data production and/or data consumption locations. One or more of the executable plan fragments may be executed on different nodes. FIG. 2 illustrates an exemplary root node 202 that may include a physical query execution plan 208 that may be split into one or more fragments 210. Each such fragment 210 may be transmitted (e.g., via a network) to one or more nodes (e.g., node 1 204 and node 2 206). For example, plan fragment 212, that may include a data consumption ("C") node may be transmitted to node 1 204 for execution. Plan fragment 214 that may include a data production ("P") node may be transmitted to node 2 206 for execution. The splitting of the physical plan 208 may be performed using a relation. At such relation, there may exist multiple data producers ("P"). Further, if some of the producers come from same node, then multiple executable plan fragments may be generated in same node. This may be disadvantageous as there may exist an inefficient network transport on the same node. Moreover, it might not be possible to share resources among local plan fragments (e.g., runtime parameters, table accessor, etc.). Further, it may be difficult to support complicated distributed functions, such as, distributed shared sub-plan(s). Additionally, it may be hinder optimization on upper-level relation(s) if one or more tables exist at one node but not included in the current plan fragment, e.g., a translation table, that may need to be grouped by valueId parameter.

As such, in some implementations, to avoid the above difficulties, the current subject matter may be configured to avoid "cutting" the algebra of the physical plan into multiple parts, and instead providing a single executable plan fragment per single node, where all local parts of the physical plan may be re-organized to ensure they may be safely combined and/or integrated into a single plan. As part of the no-cutting plan for execution of a query, the current subject matter may be configured to not cut the physical plan by producer location, whereby the entire physical plan is transmitted to each participant node for plan generation. The current subject matter may be further configured to track partition mapping change during plan generation. For example, partition mapping changes may be tracked from one pipeline breaker to another pipeline breaker. Each local pipeline (e.g., local to each participant node) may be integrated into a global execution pipeline. Using the partition mapping tracking result, local pipelines portions may be integrated into a global pipeline to allow each plan fragment to be executed by the global pipeline. In some implementations, the current subject matter may be configured to determine an order in which to trigger plan fragment execution. For example, some plan fragments may include a receive operator and/or a transmit operator and may be treated as a leaf (i.e., non-root) plan fragment, thus, it may be triggered in advance to start execution.

Figure 3:
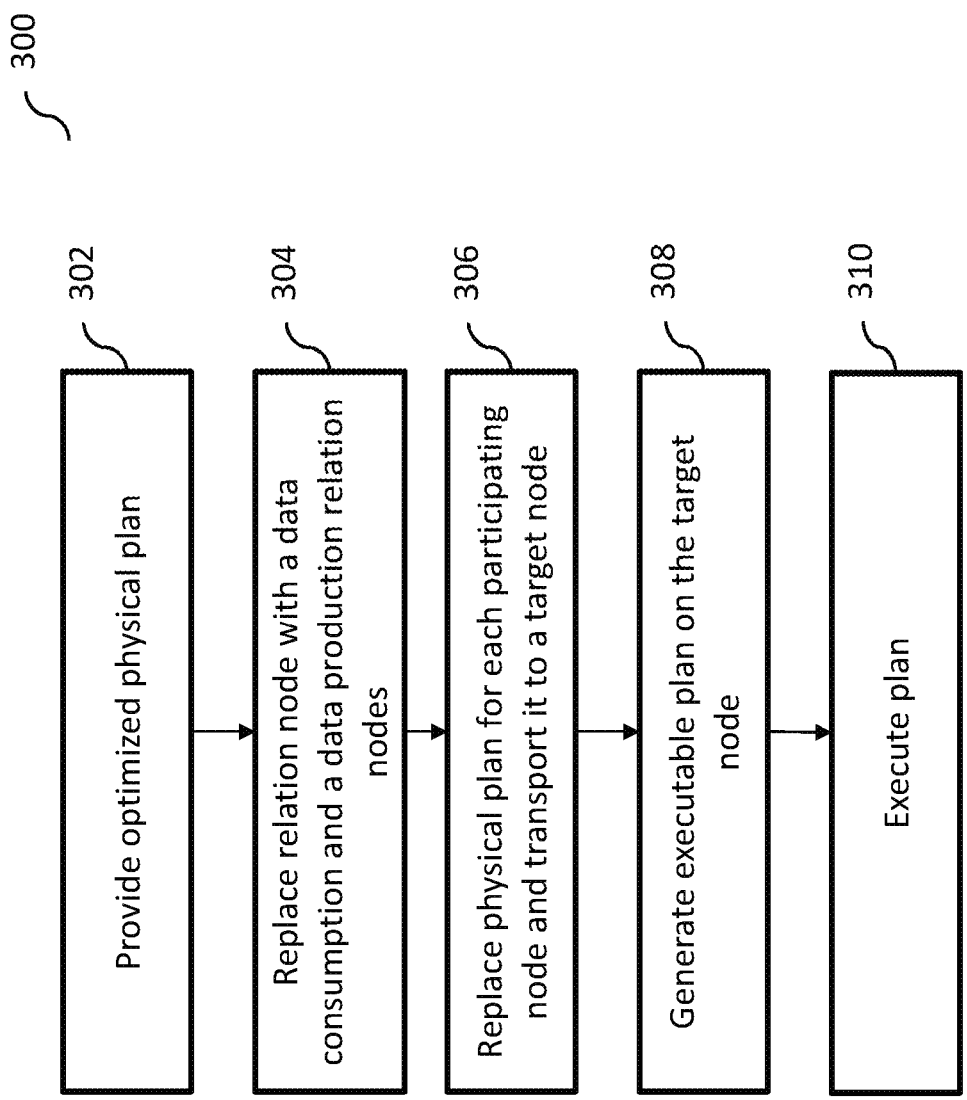
FIG. 3 illustrates an exemplary process for generating only one physical plan fragment per node in the query execution plan, according to some implementations of the current subject matter.

FIG. 3 illustrates an exemplary process 300 for generating only one physical plan fragment per node in the query execution plan, according to some implementations of the current subject matter. The process 300 may be executed by one or more components of the system 100 shown in FIG. 1.

Figure 4:
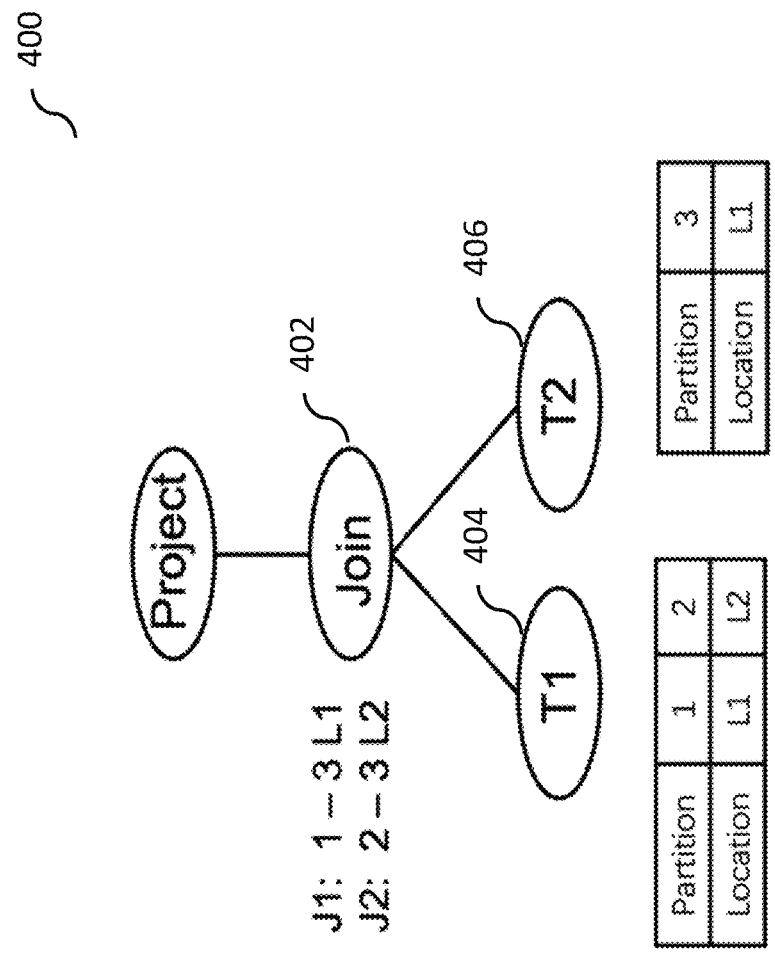
FIG. 4 illustrates an exemplary join process, according to some implementations of the current subject matter.

Plan fragments may be generated using a depth-first search ("DFS") process by visiting the input physical plan. DFS may be configured to traverse and/or search tree and/or graph data structures. DFS may start at the root node (which may select an arbitrary node as a root node in the case of a graph) and explore or visit as far as possible along each branch (each vertex/node and/or edge) before backtracking. As part of the plan fragment generation, a relation may be replaced with one data consumption node and one data production node, which may be connected to ensure that the physical plan is not cut there. The physical plan may be finalized and then transferred to each participating node to generate an executable plan. The following example (a query performs a JOIN between two tables) illustrates generation of a single plan fragment per node:

Query: SELECT*FROM T1, T2 WHERE T1.id=T2.id
In the above query, for example, table T1 may have 2 partitions, where partition 1 may be located at a location L1 (e.g., node, storage location, memory location, etc.) and partition 2 may be located at location L2. Table T2 may have only one partition (e.g., partition 3) located at location L1. According to the optimized plan, the JOIN may be executed at location L1 between partition 1 and partition 3 and at location L2 between partition 2 and partition 3. FIG. 4 illustrates an exemplary join process 400, according to some implementations of the current subject matter. As shown in FIG. 4, a join 402 may be performed between tables T1 404 and table T2 406. As stated above and shown in FIG. 4, table T1 includes partition 1 at location L1 and partition 2 at location L2, and table T2 includes partition 3 at location L1. The JOIN 402 may perform join J1: partitions 1 and 3 joined at location L1, and join J2: partitions 2 and 3 joined at location L2.

Referring back to FIG. 3, at 302, an optimized physical query execution plan may be provided. At 304, a relation in the provided physical plan may be replaced with a data consumption relation and a data production relation. The data consumption relation may be responsible for data consumption partitions at a data receiving side, the data production relation may be responsible for data production partitions at a data transmission side. Data production relation may be a child relation of the data consumption relation. Referring back to FIG. 4, according to the optimized plan, table 2 partition 3 may be transmitted to location L2 for execution of a join operation, whereby the join result may be transmitted to a root node. Thus, there may be two data relations in this plan, e.g., two data-consumption-data production relation pairs may be generated in the plan.

Figure 5:
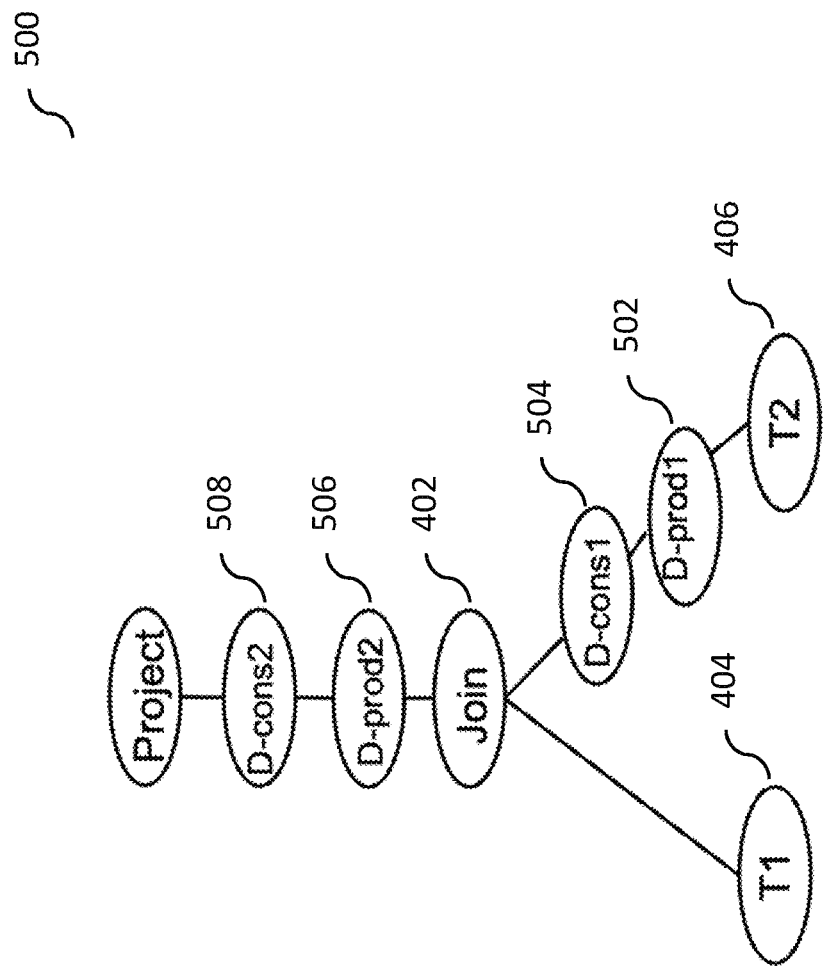
FIG. 5 illustrates an exemplary process for generating data consumption and data production nodes, according to some implementations of the current subject matter.

FIG. 5 illustrates an exemplary process 500 for generating data consumption and data production nodes, according to some implementations of the current subject matter. The process 500 may be implemented using tables 404 and 406 shown in FIG. 4 and may be used to perform the join 402 of one or more partitions of these tables.

In particular, as shown in FIG. 5, a first data production relation 502 ("D-prod1") and a first data consumption relation 504 ("D-cons1") may be generated for the purposes of executing the join 402. Subsequently, another pair of a data production and data consumption relations may be generated for execution of partition joins. Specifically, as shown in FIG. 5, a second data production relation 506 ("D-prod2") and a second data consumption relation 508 ("D-cons2") may be generated and transmitted to the root node ("Project").

Referring back to FIG. 3, the process 300, after performing replacement of relation with a data consumption and a data production relations, at 304, may proceed to replace the optimized physical plan for each participating node (e.g., nodes that may store one or more partitions of data involved in the processing pipeline) and transport the plan to the target node, where execution of the transported plan may take place, at 306. For example, for a non-root node, a projection relation may be replaced with a plan fragment root relation, which may be used to perform one or more operations at plan fragment level for each node. Further, the physical plan may be serialized into one or more desired formats (e.g., Java Script Object Notation (JSON)) and then, transmitted to each participating node. The serialized physical plan may also be saved in one or more memory locations, cache, etc. (e.g., distribution plan cache), so that it may be accessed by any non-root node and generated from a root node.

At 308, an executable plan may be generated on a target node, for execution, at 310. The executable plan may be generated using the depth-first search by analyzing and/or visiting the physical plan. The depth-first search may enter and/or come by a particular relation in the physical plan and/or exit and/or leave a particular relation in the physical plan. Upon leaving a particular relation, one or more executable operators may be generated for each relation. When a relation is visited during the depth-first search, all partitions located at such relation may be checked. If a partition exists on a node being visited, an operator may be generated, otherwise the depth-in-search may skip generation of any operators. For example, on node L1, generation of operators for D-cons1 and D-prod1 may be skipped.

Figure 6:
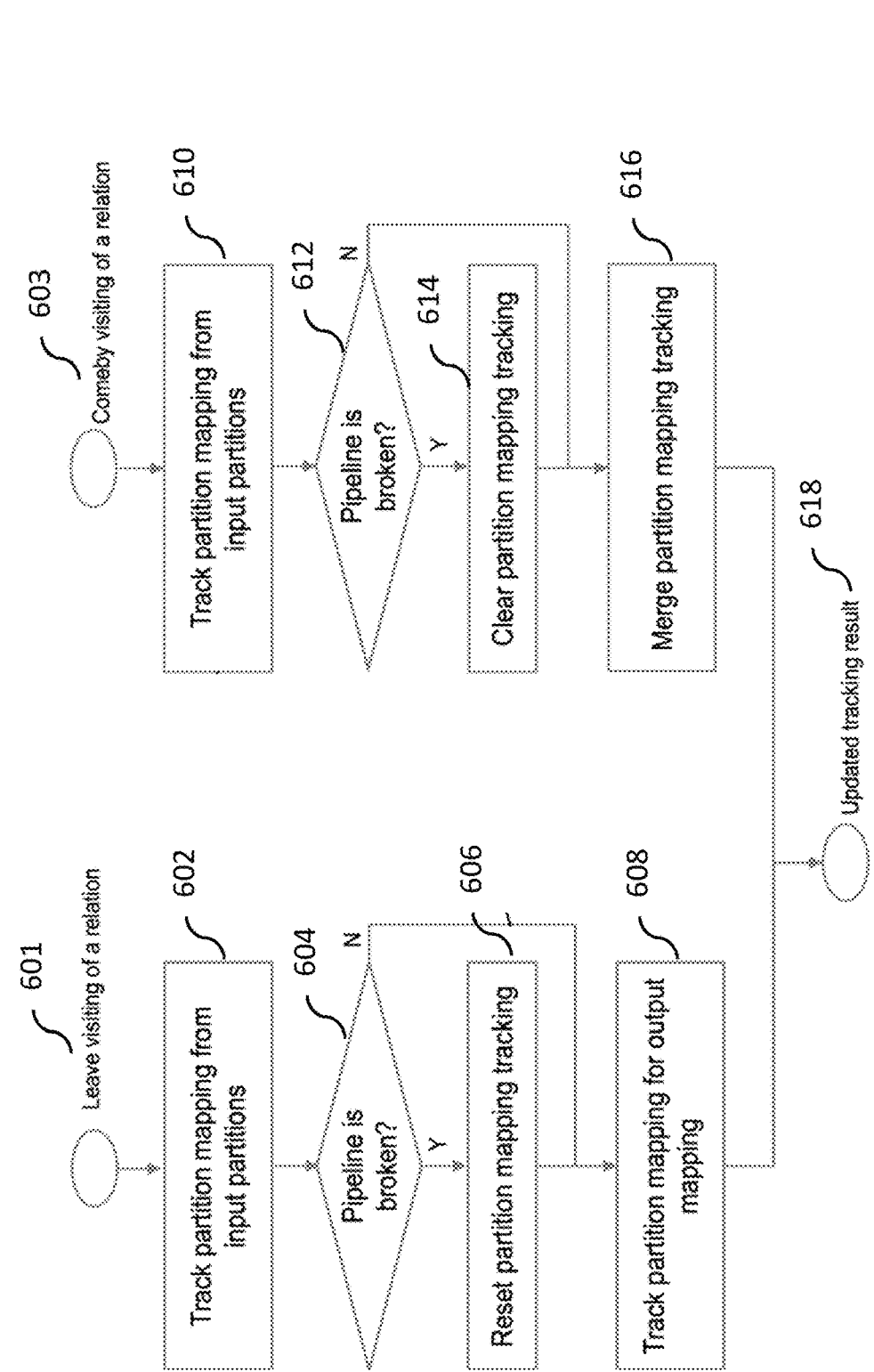
FIG. 6 illustrates an exemplary process for tracking a partition mapping change during the physical plan generation, according to some implementations of the current subject matter.

FIG. 6 illustrates an exemplary process 600 for tracking a partition mapping change during the physical plan generation, according to some implementations of the current subject matter. The tracking may be performed by one or more components of the system 100 shown in FIG. 1. As part of the physical plan of a query and execution of a pipeline corresponding to the plan, one or more relations in the plan may serve to break execution of the pipeline. Such relations may be referred to as pipeline breakers. For example, if a relation breaks an incoming pipeline from one or more child nodes, then such relation may be a pipeline breaker. For a relation having multiple child nodes, a determination of whether that relation is a pipeline breaker may depend on which child node, a particular pipeline and/or portion thereof may have come from. For example, in a NestedLoopJoin relation, a pipeline from one side may be broken, however, the pipeline from another side might not be broken, as such, one or more query operators may still be generated and/or positioned on the pipeline from the unbroken side.

In some implementations, partition mapping tracking may be performed during the depth-first search visiting an operator generation but before the operator is actually generated for the executable query plan. The partition mapping result may include a vector of map pair which may be configured to record from which partition, the current partition is being generated or transported from. Partition mapping tracking may be initiated at a leaf relation and/or a pipeline breaker and reset at another pipeline breaker. At the leaf relation, the tracking result may be initialized with its partition information, where the mapping source partition and the mapping target partition may be same at the time of initialization. Any changes for each relation may be tracked from the bottom to the top of the tree.

Figure 7:
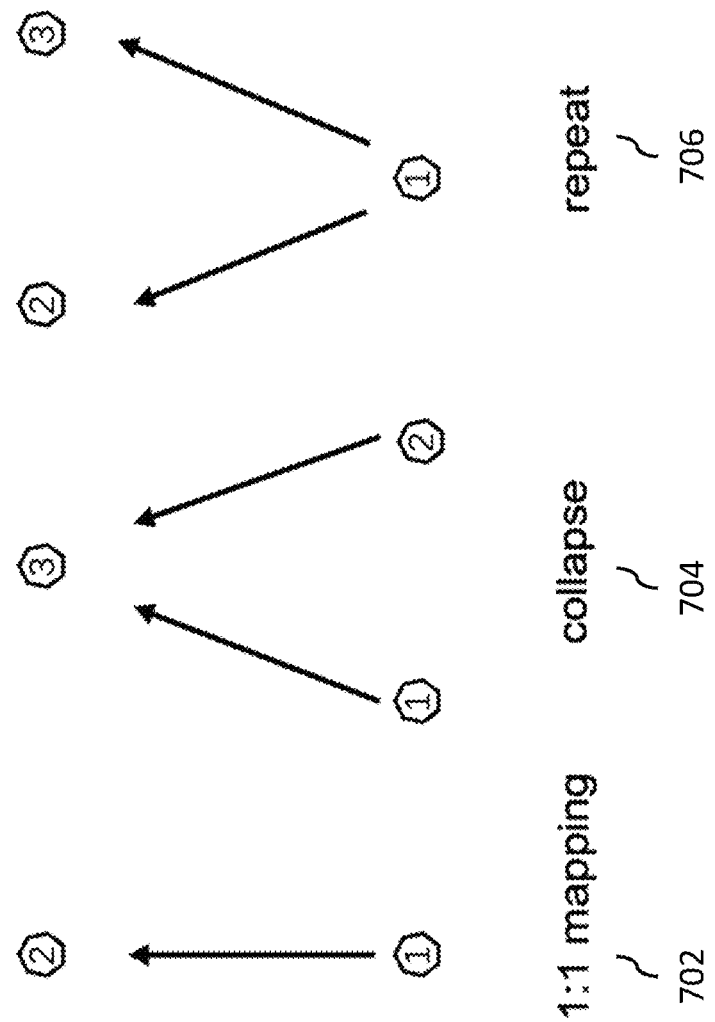
FIG. 7 illustrates exemplary types of partition mappings between input partitions and output partitions of a relation.

Referring back to FIG. 6, the tracking may be executed from the depth-first search leaving visiting a relation branch 601 and from a coming by visiting a relation branch 603. At the start of each branch 601, 603, tracking partition mapping from input partitions may be performed at 602 (for branch 601) and at 610 (for branch 603). The tracking partition mapping may be performed for one or more specific relations during query operator generation. The incoming partitions may be consumed by the query operators and may be transformed into different partitions and/or mapped to different partition identifiers (partitionID). FIG. 7 illustrates exemplary types of partition mappings between input partitions and output partitions. For example, a 1:1 mapping 702 may map a single partition (1) to a single partition (2). A collapse mapping 704 may map partition (1) and (2) to a partition (3). A repeat mapping 706 may map a single partition (1) to two partition (2) and (3).

Referring back to FIG. 6, a determination may be made whether an execution pipeline is broken (as discussed above), at 604 (for branch 601) and at 612 (for branch 603). For branch 601, if a relation exists, at 604, that serves as a pipeline breaker, then the partition mapping tracking process may be reset, at 606. In this case, the partition information associated with a current relation (which may be the pipeline breaker) may serve as a mapping source and a mapping target. Otherwise, if the relation is not a pipeline breaker, the processing may proceed to execute tracking partition mapping for output mapping, at 608. In the optimized plan, the current subject matter may be configured to coordinate partition information between parent and child relations using an extra mapping, where such mapping may also be tracked. The process 600 may then output an updated tracking result, at 618.

For branch 603, if a relation exists, at 612, that serves as a pipeline breaker, then the partition mapping tracking process may be cleared, at 614. In this case, the partition information associated with a current relation (which may be the partition breaker) may serve as a mapping source and a mapping target. Otherwise, if the relation is not a pipeline breaker, at 612, the processing may proceed to execute merging of partition mapping tracking, at 616. In case a relation has multiple child nodes, and the depth-first search begins to visit the next child node, if the pipeline is not broken, the current partition tracking result may be merged with the one for previous child nodes and appended into previous vector as a new tracking result. The process 600 may then output an updated tracking result, at 618.

Once the tracking result has been updated, the current subject matter may be configured to integrate one or more local partition pipelines into a single global pipeline. For a distributed plan, assuming all data consumption and production relations are at one node that becomes a local plan, the pipeline may process operators below data production relation and operators above data consumption relation, thereby making a global pipeline in the distributed plan. The global pipeline may connect several local pipelines if data exchange is involved between different nodes.

Figure 8:
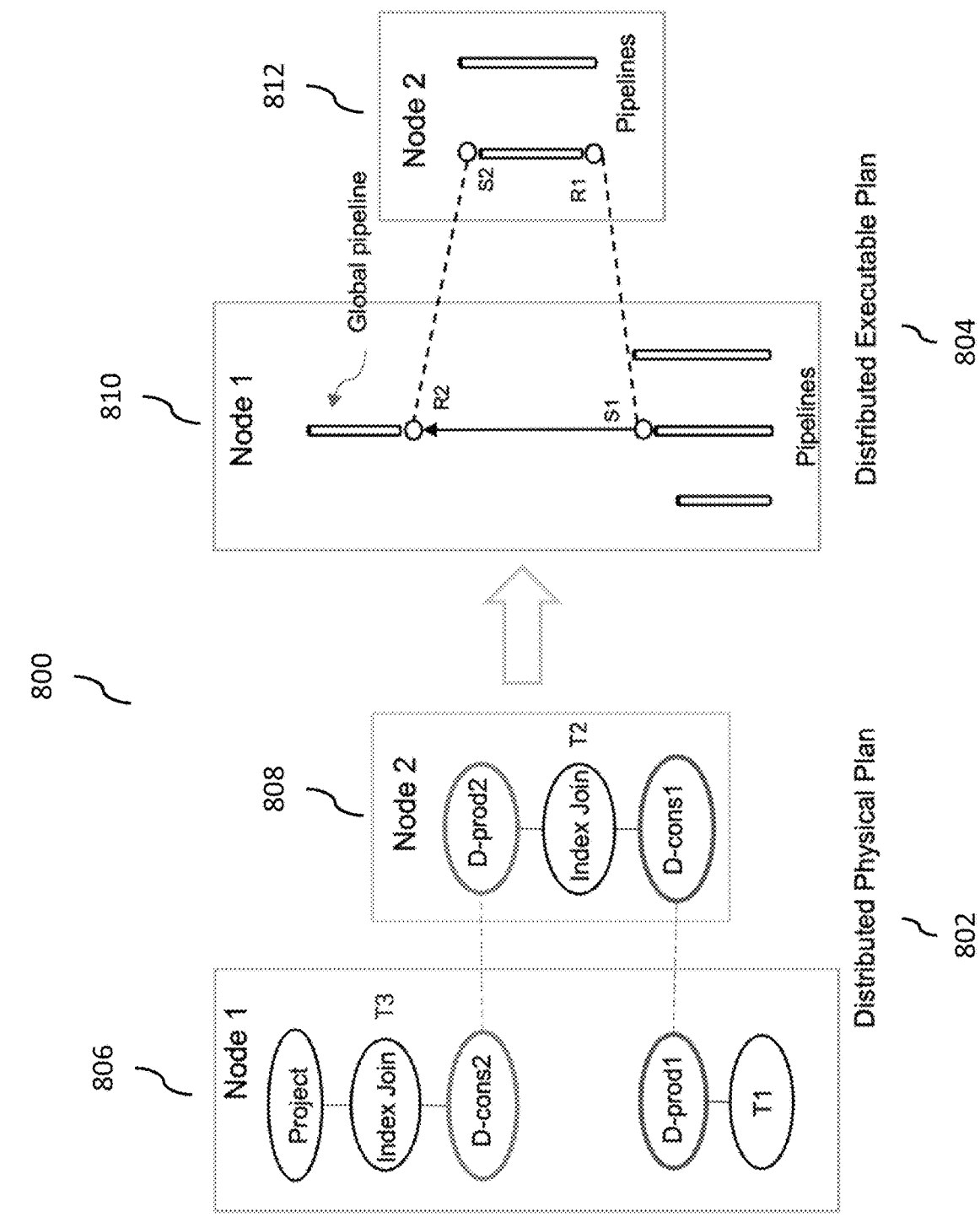
FIG. 8 illustrates an exemplary process for generating a global pipeline, according to some implementations of the current subject matter.

FIG. 8 illustrates an exemplary process 800 for generating a global pipeline, according to some implementations of the current subject matter. The process 800 may include a distributed physical plan 802 and a distributed executable plan 804. The distributed physical plan may include a node 1 806 and a node 2 808. In the distributed executable plan node 1 810 may include a global pipeline and node 2 812 may include one or more pipelines that may be integrated into the global pipeline at Node 1 810.

In the distributed physical plan, table T1 may be transmitted to Node 2 808, via a data production relation ("D-prod1") at Node 1 806 and data consumption relation ("D-cons1") at Node 2 808 to perform a first index join with table T2 on Node 2 808. The results may be transmitted back to Node 1 806 via data production relation ("D-prod2") at Node 2 808 and data consumption relation ("D-cons2") at Node 1 806 to perform a second index join at table T3 on Node 1 806.

Assuming table T2 is also on Node 1 806, operators from table T2, first index join and second index join may be included into the same global pipeline, corresponding to the distributed executable plan 804. The two local partition pipelines (corresponding to the first and second index joins) on node 2 812 may be connected using a transmit operator s1 and a receive operator r2 to generate a global pipeline on node 1 810.

In the distributed executable query plan 804, one operator may be included into the plan's global pipeline, where the plan may be executed with global pipeline by the global pipeline. A decision to generate a global pipeline may be made at a data consumption relation based on the current partition mapping tracking result (generated by the process 600 shown in FIG. 6), where a receive operator may be placed into an existing pipeline and/or start a new pipeline.

Figure 9:
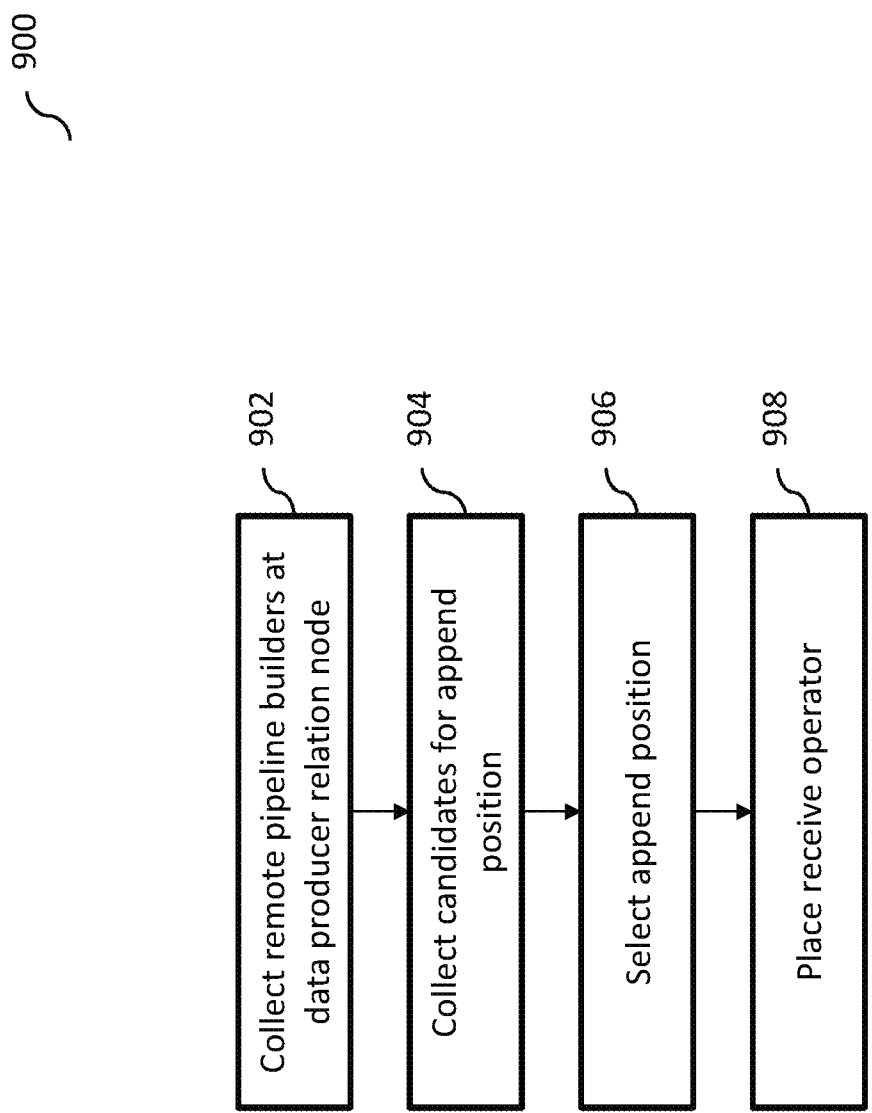
FIG. 9 illustrates an exemplary process for integrating local part pipelines into a global pipeline, according to some implementations of the current subject matter.

FIG. 9 illustrates an exemplary process 900 for integrating local part pipelines into a global pipeline, according to some implementations of the current subject matter. The process 900 may be executed using one or more components of the system 100 shown in FIG. 1. At 902, one or more remote pipeline builders may be collected at one or more data production relations. The pipeline builder may contain a current append position for one or more next operators to place. At a data production relation, if one data partition is transmitted to another node, a pipeline builder may be generated for that partition and its current append position may be the transmit operator. Such pipeline builder may be referred to as a remote pipeline builder.

There may be multiple remote pipeline builders for a single data producer relation, whereby all such builders may be collected and saved into a map. When the depth-first search visits a pipeline breaker, the collected remote pipeline builders may be cleared. However, when the depth-first search visits a N-ary relation, the collected result may be merged with the result from previous child node.

At 904, candidates for append position may be collected. The collection may be performed when generating a receive operator for data consumption relation. The candidates (C) may be evaluated using the following $$C=S(T(C_{local}) \cup T(C_{remote}))$$

where $C_{local}$ refers to the append positions from one or more local incoming partitions that may be obtained from one or more incoming pipeline builders. $C_{remote}$ refers to the append positions from remote pipeline builders. Function T execute translation for partition ID of a pipeline builder based on partition mapping tracking result. After translation, the translated parts may be merged into one. Append positions may be merged if they have same partition ID. Function S may sort the merged result based on the partition ID position in the partition mapping tracking result.

At 906, the current subject matter may be configured to select an append position. For a receive operator r, to determine where it needs to be placed, candidates from C may be evaluated until there is one candidate c that satisfies:

$$P(c.\text{partitionId}) \geq P(r.\text{partitionId})$$

where function P may returns the position in partition mapping tracking result.

If there is no such candidate then the receive operator may be placed in a new pipeline. Otherwise, the receive operator may be placed after the append position of the candidate.

At 908, the receive operator may be placed in the pipeline. If there are multiple receive operators in same append position, a control operator may be placed after the append position. The multiple receive operators may then be placed after the control operator and may be executed in parallel. If the current operator in the append position is not compatible with the receive operator, one or more dummy operators may be generated to build a bridge between them. The receive operator may be placed after the bridge.

Figure 10:
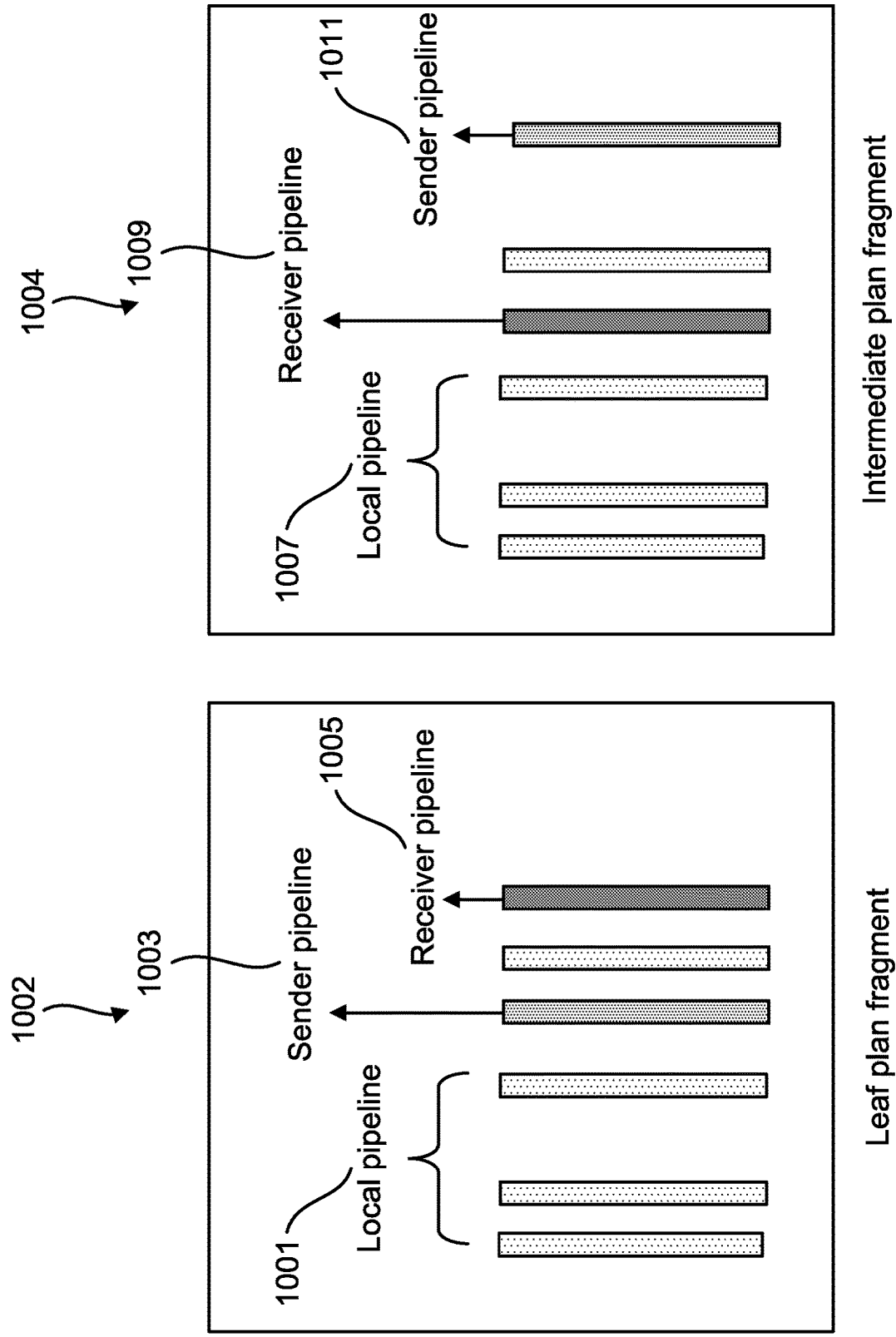
FIG. 10 illustrates exemplary types of plan fragment, according to some implementations of the current subject matter.

Once the local pipelines have been integrated into a global pipelines, an order in which each plan fragment is to be triggered for execution may be determined. A leaf type plan fragment may be triggered first during execution and it may have transmit operator but no receive operator. This might not be enough in the no-cutting plan, as some plan fragments may be mixed with transmit operator(s) and/or receive operator(s) that may be treated as leaf plan fragments. The plan fragment type may be determined during executable plan generation. In the executable plan, if there is no receiver pipeline before the first sender pipeline then it may be considered as a leaf type plan fragment. FIG. 10 illustrates exemplary plan fragments, according to some implementations of the current subject matter. For example, a leaf plan fragment 1002 may include one or more local pipelines 1001, a sender pipeline 1003, and a receiver pipeline 1005. An intermediate plan fragment 1004 may include one or more local pipelines 1007, a receiver pipeline 1009, and a sender pipeline 1011.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 11:
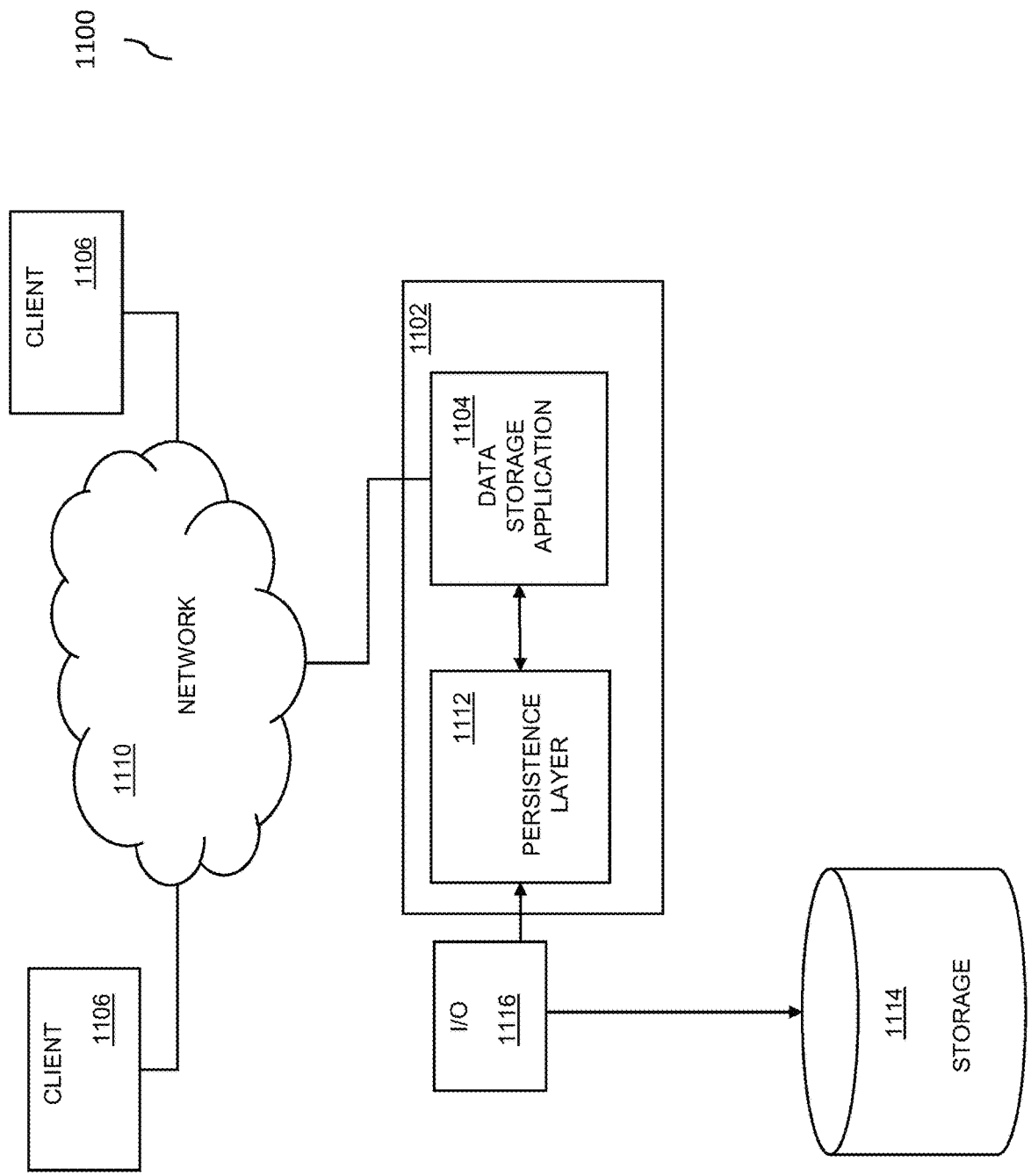
FIG. 11 is a diagram illustrating an exemplary system including a data storage application, according to some implementations of the current subject matter.

FIG. 11 illustrates an exemplary system 1100 in which a computing system 1102, which may include one or more programmable processors that may be collocated, linked over one or more networks, etc., executes one or more modules, software components, or the like of a data storage application 1104, according to some implementations of the current subject matter. The data storage application 1104 may include one or more of a database, an enterprise resource program, a distributed storage system (e.g. NetApp Filer available from NetApp of Sunnyvale, CA), or the like.

The one or more modules, software components, or the like may be accessible to local users of the computing system 1102 as well as to remote users accessing the computing system 1102 from one or more client machines 1106 over a network connection 1110. One or more user interface screens produced by the one or more first modules may be displayed to a user, either via a local display or via a display associated with one of the client machines 1106. Data units of the data storage application 1104 may be transiently stored in a persistence layer 1112 (e.g., a page buffer or other type of temporary persistency layer), which may write the data, in the form of storage pages, to one or more storages 1114, for example via an input/output component 1116. The one or more storages 1114 may include one or more physical storage media or devices (e.g. hard disk drives, persistent flash memory, random access memory, optical media, magnetic media, and the like) configured for writing data for longer term storage. It should be noted that the storage 1114 and the input/output component 1116 may be included in the computing system 1102 despite their being shown as external to the computing system 1102 in FIG. 11.

Data retained at the longer term storage 1114 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 12:
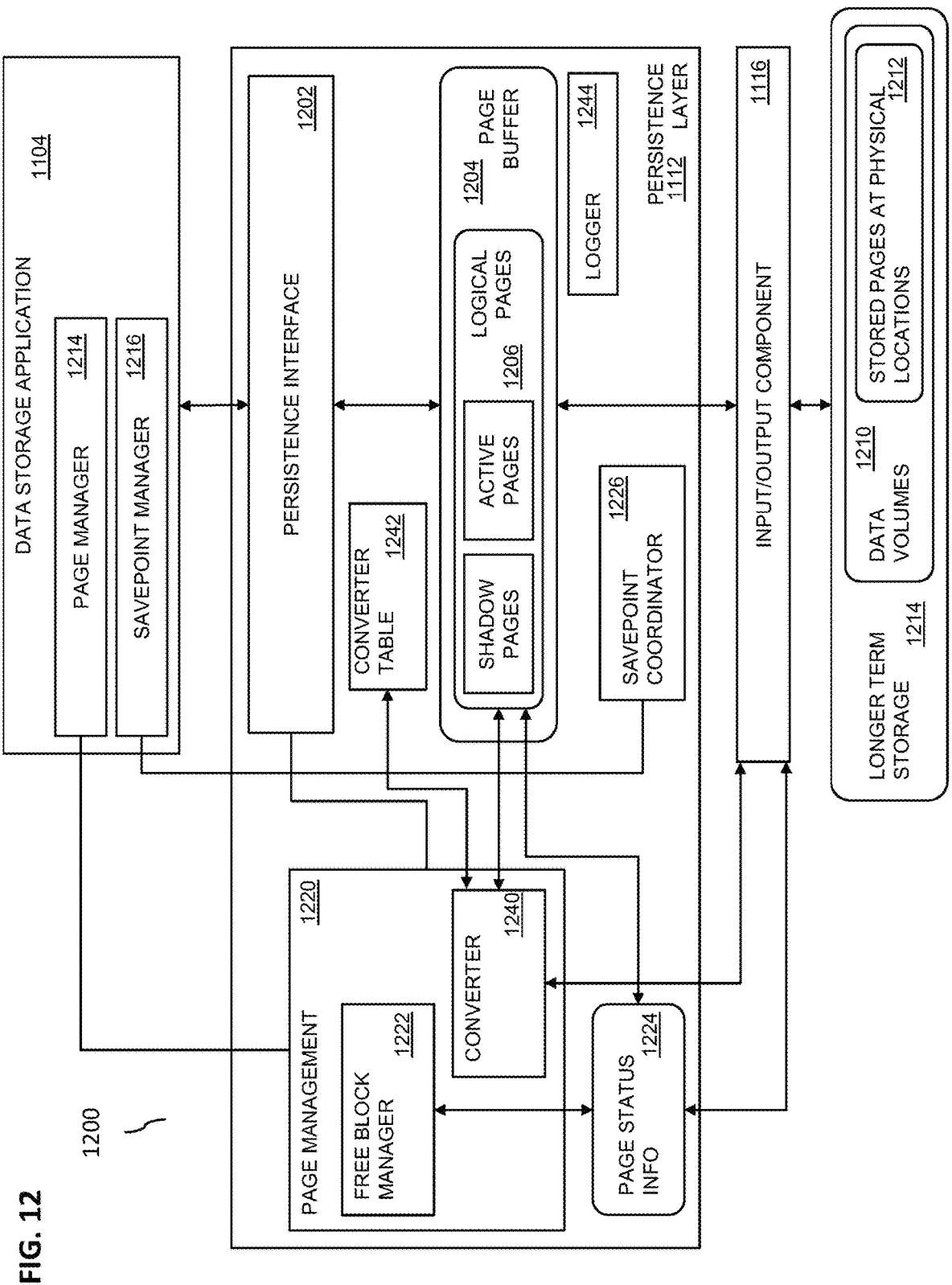
FIG. 12 is a diagram illustrating details of the system of FIG. 11.

FIG. 12 illustrates exemplary software architecture 1200, according to some implementations of the current subject matter. A data storage application 1104, which may be implemented in one or more of hardware and software, may include one or more of a database application, a network-attached storage system, or the like. According to at least some implementations of the current subject matter, such a data storage application 1104 may include or otherwise interface with a persistence layer 1112 or other type of memory buffer, for example via a persistence interface 1202. A page buffer 1204 within the persistence layer 1112 may store one or more logical pages 1206, and optionally may include shadow pages, active pages, and the like. The logical pages 1206 retained in the persistence layer 1112 may be written to a storage (e.g. a longer term storage, etc.) 1114 via an input/output component 1116, which may be a software module, a sub-system implemented in one or more of software and hardware, or the like. The storage 1114 may include one or more data volumes 1210 where stored pages 1212 are allocated at physical memory blocks.

In some implementations, the data storage application 1104 may include or be otherwise in communication with a page manager 1214 and/or a savepoint manager 1216. The page manager 1214 may communicate with a page management module 1220 at the persistence layer 1112 that may include a free block manager 1222 that monitors page status information 1224, for example the status of physical pages within the storage 1114 and logical pages in the persistence layer 1112 (and optionally in the page buffer 1204). The savepoint manager 1216 may communicate with a savepoint coordinator 1226 at the persistence layer 1112 to handle savepoints, which are used to create a consistent persistent state of the database for restart after a possible crash.

In some implementations of a data storage application 1104, the page management module of the persistence layer 1112 may implement a shadow paging. The free block manager 1222 within the page management module 1220 may maintain the status of physical pages. The page buffer 1204 may include a fixed page status buffer that operates as discussed herein. A converter component 1240, which may be part of or in communication with the page management module 1220, may be responsible for mapping between logical and physical pages written to the storage 1114. The converter 1240 may maintain the current mapping of logical pages to the corresponding physical pages in a converter table 1242. The converter 1240 may maintain a current mapping of logical pages 1206 to the corresponding physical pages in one or more converter tables 1242. When a logical page 1206 is read from storage 1114, the storage page to be loaded may be looked up from the one or more converter tables 1242 using the converter 1240. When a logical page is written to storage 1114 the first time after a savepoint, a new free physical page is assigned to the logical page. The free block manager 1222 marks the new physical page as "used" and the new mapping is stored in the one or more converter tables 1242.

The persistence layer 1112 may ensure that changes made in the data storage application 1104 are durable and that the data storage application 1104 may be restored to a most recent committed state after a restart. Writing data to the storage 1114 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 1244 may also be included to store the changes made to the data of the data storage application in a linear log. The logger component 1244 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 1244 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 1112 may use a combination of undo log entries (from one or more logs) and shadow paging.

The persistence interface 1202 may handle read and write requests of stores (e.g., in-memory stores, etc.). The persistence interface 1202 may also provide write methods for writing data both with logging and without logging. If the logged write operations are used, the persistence interface 1202 invokes the logger 1244. In addition, the logger 1244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 1244. For an entry of type "update", for example, this would be the identification of the affected record and the after image of the modified data.

When the data application 1104 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 1244 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 1244 may write a database log (or simply referred to herein as a "log") sequentially into a memory buffer in natural order (e.g., sequential order, etc.). If several physical hard disks/storage devices are used to store log data, several log partitions may be defined. Thereafter, the logger 1244 (which as stated above acts to generate and organize log data) may loadbalance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 1104 may use shadow paging so that the savepoint manager 1216 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 13:
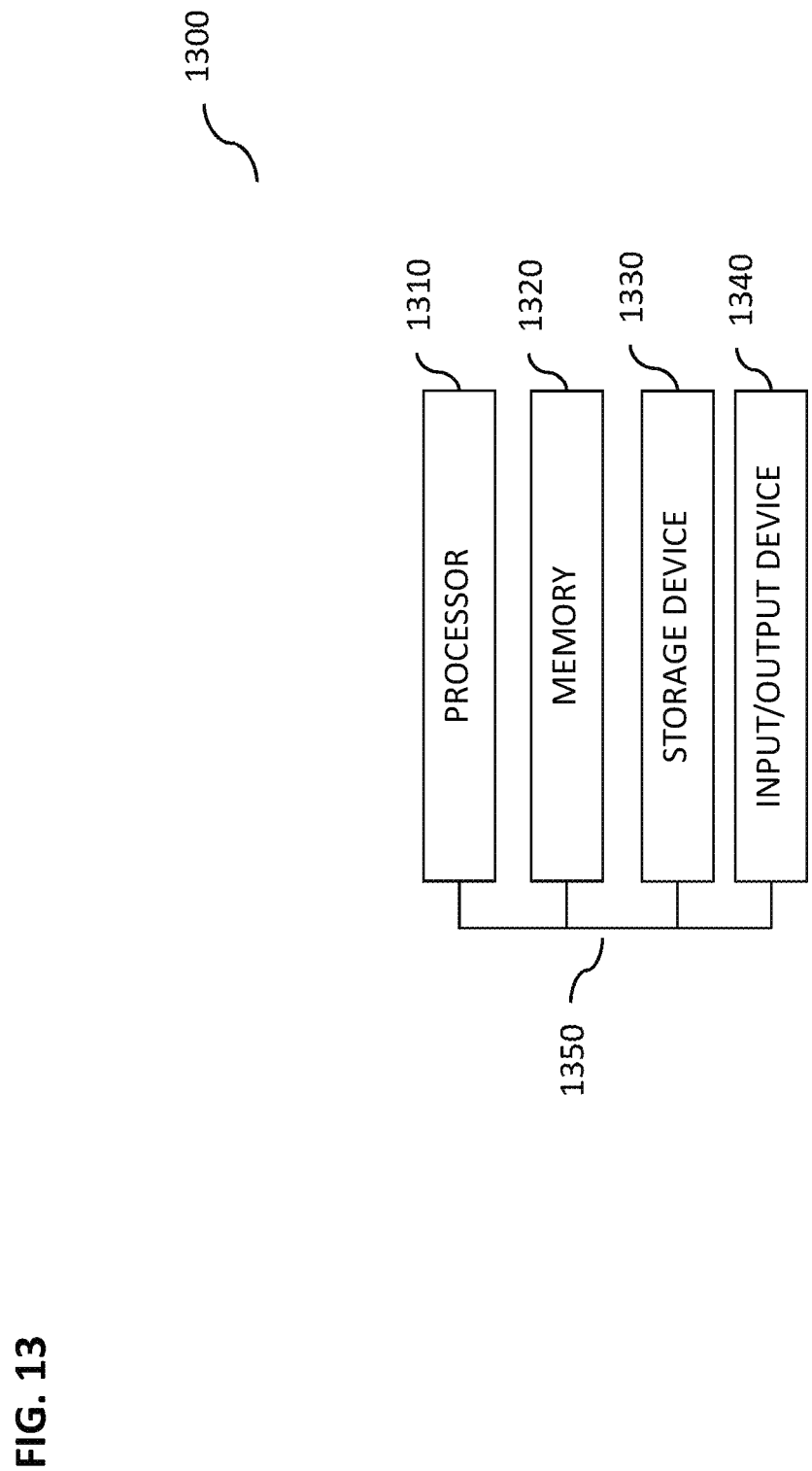
FIG. 13 is an exemplary system, according to some implementations of the current subject matter.

In some implementations, the current subject matter may be configured to be implemented in a system 1300, as shown in FIG. 13. The system 1300 may include a processor 1310, a memory 1320, a storage device 1330, and an input/output device 1340. Each of the components 1310, 1320, 1330 and 1340 may be interconnected using a system bus 1350. The processor 1310 may be configured to process instructions for execution within the system 1300. In some implementations, the processor 1310 may be a single-threaded processor. In alternate implementations, the processor 1310 may be a multi-threaded processor. The processor 1310 may be further configured to process instructions stored in the memory 1320 or on the storage device 1330, including receiving or sending information through the input/output device 1340. The memory 1320 may store information within the system 1300. In some implementations, the memory 1320 may be a computer-readable medium. In alternate implementations, the memory 1320 may be a volatile memory unit. In yet some implementations, the memory 1320 may be a non-volatile memory unit. The storage device 1330 may be capable of providing mass storage for the system 1300. In some implementations, the storage device 1330 may be a computer-readable medium. In alternate implementations, the storage device 1330 may be a floppy disk device, a hard disk device, an optical disk device, a tape device, non-volatile solid state memory, or any other type of storage device. The input/output device 1340 may be configured to provide input/output operations for the system 1300. In some implementations, the input/output device 1340 may include a keyboard and/or pointing device. In alternate implementations, the input/output device 1340 may include a display unit for displaying graphical user interfaces.

Figure 14:
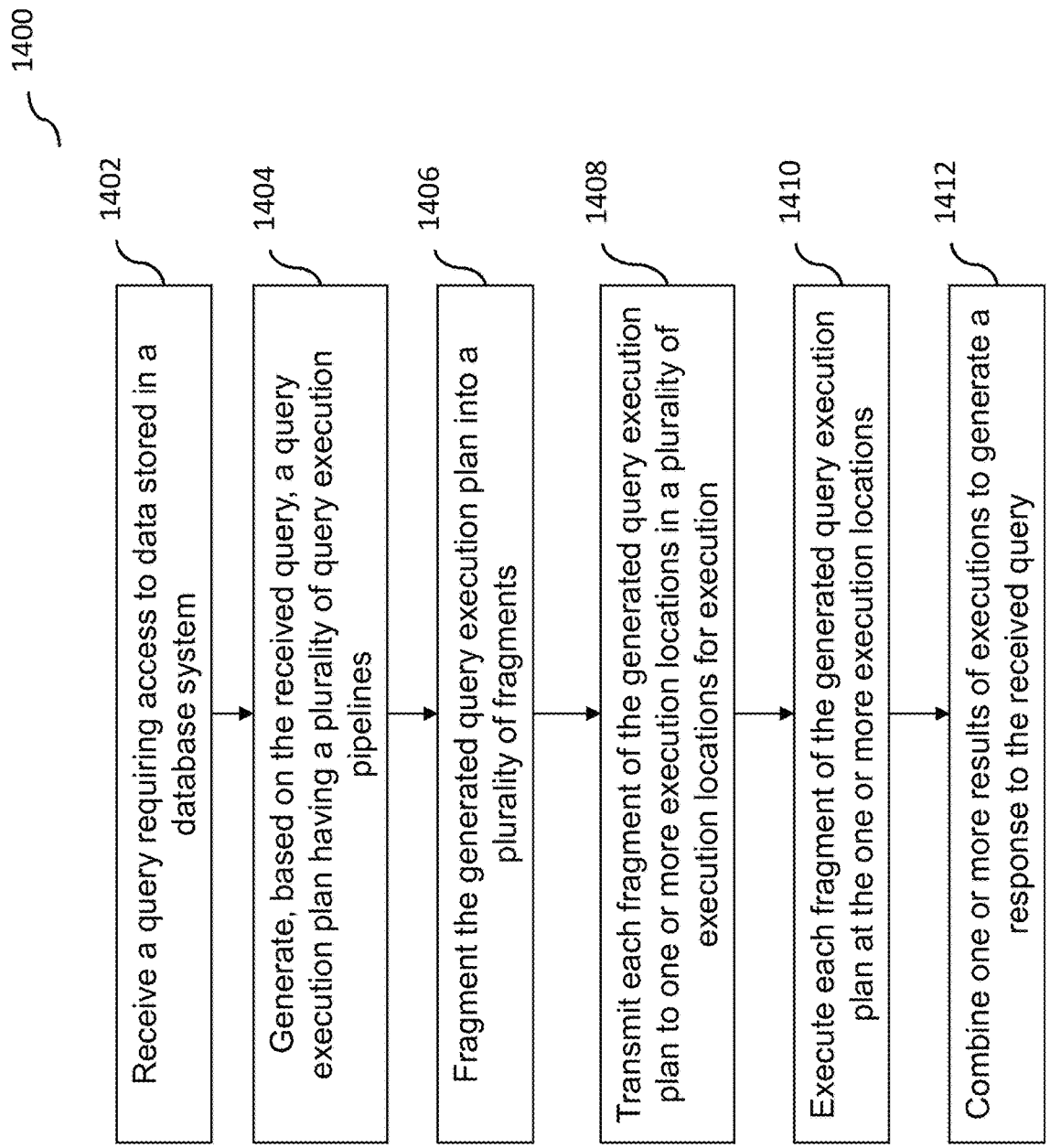
FIG. 14 is an exemplary method, according to some implementations of the current subject matter.

FIG. 14 illustrates an exemplary method 1400 for generating a query executable plan, according to some implementations of the current subject matter. At 1402, a query requiring access to data stored in a database system may be received. For example, the query may be received by the system 100 shown in FIG. 1. At 1404, using the received query, a query execution plan may be generated. The plan may include a plurality of query execution pipelines (e.g., as shown in FIG. 6 et seq.). Each query execution pipeline in the plurality of query execution pipelines may be configured to execute a plurality of operations in a predetermined order associated with each query execution pipeline.

At 1406, the generated query execution plan may be fragmented into a plurality of fragments. Each fragment may include one or more query execution pipelines (e.g., as shown in FIG. 8) in the plurality of query execution pipelines. At 1408, each fragment of the generated query execution plan may be transmitted to one or more execution locations (e.g., nodes, where each node receives a fragment of the query plan) in a plurality of execution locations for execution. At 1410, each fragment of the generated query execution plan may be executed at one or more execution locations. The results of executions may be combined to generate a response to the received query, at 1412

In some implementations, the current subject matter may include one or more of the following optional features. One or more locations may include a data consumption location and a data production location.

In some implementations, the method may include determining an order of the executing of the plurality of fragments. The method may also include generating a mapping of each transmitted fragment. The method may also determine that there is a break in one or more query execution pipelines in the plurality of query execution pipelines, and update the generated mapping for each transmitted fragment associated with the determined break in one or more query execution pipelines.

In some implementations, the plurality of fragments may include a root fragment and one or more non-root fragments, where execution of the root fragment may be configured to trigger execution of one or more non-root fragments. Execution of a query execution pipeline of the root fragment may include executing a receiving operator to receive data queried by the received query from one or more non-root fragments. Execution of a query execution pipeline of the non-root fragment may include executing a transmitting operator to transmit data queried by the received query to the root fragment.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   receiving a query requiring access to data stored in a database system;
   generating, based on the received query, a query execution plan using a depth-first search by analyzing a physical plan, the query execution plan having a plurality of query execution pipelines, each query execution pipeline in the plurality of query execution pipelines being configured to execute a plurality of operations in a predetermined order associated with each query execution pipeline;
   tracking partition mapping changes during the depth-first search but before operators are generated for the query execution plan, wherein a partition mapping result includes a map pair vector which records from which partition a current partition is generated;
   initiating partition mapping tracking at a pipeline breaker and resetting partition mapping tracking at another pipeline breaker;
   fragmenting the generated query execution plan into a plurality of fragments, each fragment having one or more query execution pipelines in the plurality of query execution pipelines;
   transmitting each fragment of the generated query execution plan to one or more execution locations in a plurality of execution locations for execution;
   executing each fragment of the generated query execution plan at the one or more execution locations; and
   combining one or more results of executions to generate a response to the received query.

2. The method according to claim 1, further comprising tracking partition mapping changes from a first pipeline breaker to a second pipeline breaker.

3. The method according to claim 1, further comprising clearing a partition mapping tracking process if a current relation exists that serves as a pipeline breaker, wherein partition information associated with the current relation serves as a mapping source and a mapping target.

4. The method according to claim 1, further comprising replacing a relation in the physical plan with a data consumption relation and a data production relation.

5. The method according to claim 1, further comprising:
   executing a translation for a partition identifier of a pipeline builder based on the partition mapping tracking result;
   after executing the translation, merging translated parts into a merged result; and
   sorting the merged result based on a partition identifier position in the partition mapping tracking result.

6. The method according to claim 2, wherein the plurality of fragments include a root fragment and one or more non-root fragments, wherein execution of the root fragment is configured to trigger execution of the one or more non-root fragments.

7. The method according to claim 1, further comprising:
   visiting a next child node during the depth-first search when a relation has multiple child nodes;

merging a current partition tracking result with a previous partition tracking node for previous child nodes if the pipeline is not broken; and appending the current partition tracking result into a previous map pair vector as a new partition tracking result.

8. The method according to claim 6, wherein execution of a query execution pipeline of the non-root fragment includes executing a transmitting operator to transmit data queried by the received query to the root fragment.

9. A system comprising:
at least one programmable processor; and
a non-transitory machine-readable medium storing instructions that, when executed by the at least one programmable processor, cause the at least one programmable processor to perform operations comprising:
receiving a query requiring access to data stored in a database system;
generating, based on the received query, a query execution plan using a depth-first search by analyzing a physical plan, the query execution plan having a plurality of query execution pipelines, each query execution pipeline in the plurality of query execution pipelines being configured to execute a plurality of operations in a predetermined order associated with each query execution pipeline;
tracking partition mapping changes during the depth-first search but before operators are generated for the query execution plan, wherein a partition mapping result includes a map pair vector which records from which partition a current partition is generated;
initiating partition mapping tracking at a pipeline breaker and resetting partition mapping tracking at another pipeline breaker;
fragmenting the generated query execution plan into a plurality of fragments, each fragment having one or more query execution pipelines in the plurality of query execution pipelines;
transmitting each fragment of the generated query execution plan to one or more execution locations in a plurality of execution locations for execution;
executing each fragment of the generated query execution plan at the one or more execution locations; and
combining one or more results of executions to generate a response to the received query.

10. The system according to claim 9, wherein the operations further comprise tracking partition mapping changes from a first pipeline breaker to a second pipeline breaker.

11. The system according to claim 9, wherein the operations further comprise clearing a partition mapping tracking process if a current relation exists that serves as a pipeline breaker, wherein partition information associated with the current relation serves as a mapping source and a mapping target.

12. The system according to claim 9, wherein the operations further comprise replacing a relation in the physical plan with a data consumption relation and a data production relation.

13. The system according to claim 9, wherein the operations further comprise:
executing a translation for a partition identifier of a pipeline builder based on the partition mapping tracking result;
after executing the translation, merging translated parts into a merged result; and sorting the merged result based on a partition identifier position in the partition mapping tracking result.

14. The system according to claim 10, wherein the plurality of fragments include a root fragment and one or more non-root fragments, wherein execution of the root fragment is configured to trigger execution of the one or more non-root fragments.

15. The system according to claim 9, wherein execution of a query execution pipeline of the root fragment includes executing a receiving operator to receive data queried by the received query from one or more non-root fragments further comprising:
visiting a next child node during the depth-first search when a relation has multiple child nodes;
merging a current partition tracking result with a previous partition tracking node for previous child nodes if the pipeline is not broken; and
appending the current partition tracking result into a previous map pair vector as a new partition tracking result.

16. The system according to claim 14, wherein execution of a query execution pipeline of the non-root fragment includes executing a transmitting operator to transmit data queried by the received query to the root fragment.

17. A computer program product comprising a non-transitory machine-readable medium storing instructions that, when executed by at least one programmable processor, cause the at least one programmable processor to perform operations comprising:
receiving a query requiring access to data stored in a database system;
generating, based on the received query, a query execution plan using a depth-first search by analyzing a physical plan, the query execution plan having a plurality of query execution pipelines, each query execution pipeline in the plurality of query execution pipelines being configured to execute a plurality of operations in a predetermined order associated with each query execution pipeline;
tracking partition mapping changes during the depth-first search but before operators are generated for the query execution plan, wherein a partition mapping result includes a map pair vector which records from which partition a current partition is generated;
initiating partition mapping tracking at a pipeline breaker and resetting partition mapping tracking at another pipeline breaker;
fragmenting the generated query execution plan into a plurality of fragments, each fragment having one or more query execution pipelines in the plurality of query execution pipelines;
transmitting each fragment of the generated query execution plan to one or more execution locations in a plurality of execution locations for execution;
executing each fragment of the generated query execution plan at the one or more execution locations; and
combining one or more results of executions to generate a response to the received query.

18. The computer program product according to claim 17, wherein the operations further comprise tracking partition mapping changes from a first pipeline breaker to a second pipeline breaker.

19. The computer program product according to claim 17, wherein the operations further comprise clearing a partition mapping tracking process if a current relation exists that serves as a pipeline breaker, wherein partition information associated with the current relation serves as a mapping source and a mapping target.

20. The computer program product according to claim 17, wherein the operations further comprise replacing a relation in the physical plan with a data consumption relation and a data production relation.

* * * * *